G. GARDNER.

Boring-Machine.

No. 9,114. Reissued Mar. 9, 1880.

Witnesses

Harold Serrell

Geo. T. Pinckney

Inventor

George Gardner per

Lemuel W. Serrell

Atty.

UNITED STATES PATENT OFFICE.

GEORGE GARDNER, OF WESTFIELD, NEW JERSEY.

BORING-MACHINE.

SPECIFICATION forming part of Reissued Letters Patent No. 9,114, dated March 9, 1880.

Original No. 146,246, dated January 6, 1874. Application for reissue filed January 10, 1880.

*To all whom it may concern:*

Be it known that I, GEORGE GARDNER, formerly of Glen Gardner, in the county of Hunterdon, in the State of New Jersey, now of Westfield, New Jersey, have invented certain Improvements in Boring-Machines, of which the following is a specification.

Before my invention holes had been bored in various articles by means of a guide-plate or jig, in which the article to be bored was held, or to which article the jig or templet is connected. In these instances the drill passes through the hole in the jig or templet, and the drill has to be of a length sufficient for passing through the hole to reach the article to be bored. The templet is liable to injury by contact with the drill, and time is lost in consequence of the extended movement that is necessarily given to the drill.

In some instances a guide-stud has been provided against which to move a pattern in carving machinery, or the said stud is within a groove or slot in the pattern. A bed with holes and a movable pin have also been used in boring-machines.

My invention consists in the combination, with the bed and guide-stud, of a drill in line with the guide-stud and a pattern with guide-holes on the under side and adapted to receive on the upper side and be secured to the seat or other article to be bored, so that the guide-stud acts at one side of the pattern to determine the position of the hole that is bored into the article at the other side of the pattern, and the boring-tool does not come into contact with the holes in the pattern; hence they are not worn or injured, and the pattern and article are easily changed from place to place as the boring progresses.

Figure 3:
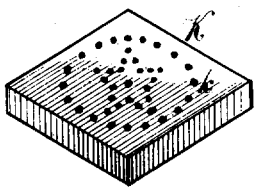
Figure 1:
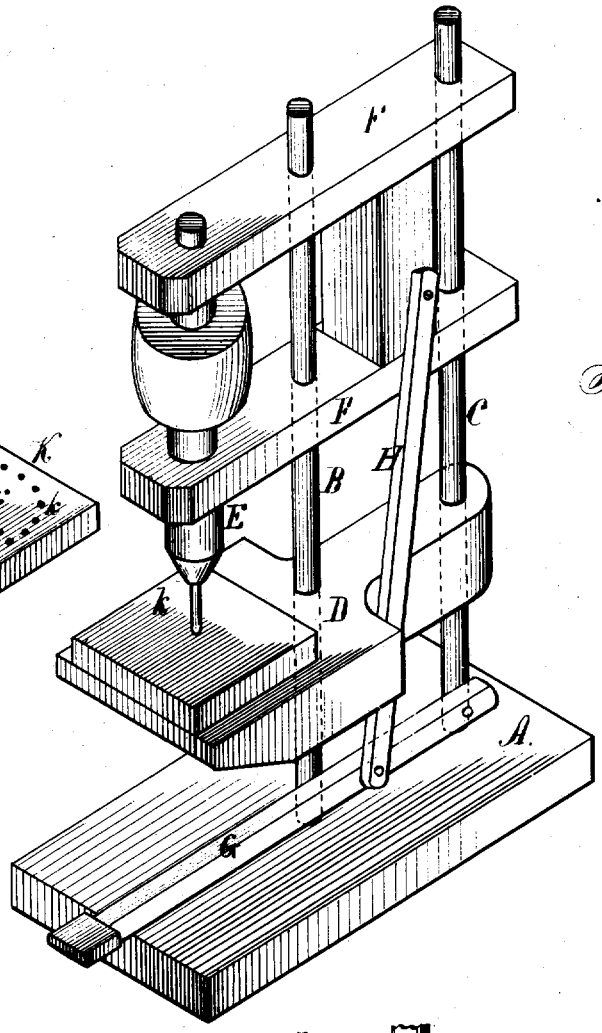
Figure 2:
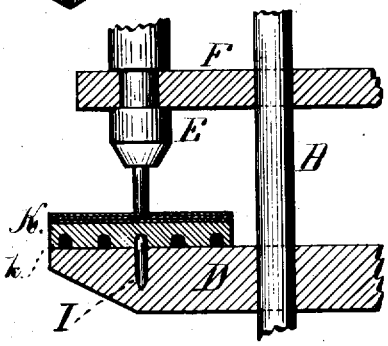

Figure 1 is a perspective view of a boring-machine embodying my improvement. Fig. 2 is a sectional detail view. Fig. 3 illustrates, in perspective, the under side of the pattern.

The boring-machine delineated in the annexed drawings consists of a bed-plate, A, carrying two fixed standards, B and C, a table, D, secured to the standards, and a boring stock or spindle, E, which turns in bearings on the frame F, which is capable of sliding on the standards B and C, and is depressed by means of a treadle, G, through the medium of a connecting-rod, H.

A guide-stud, I, is secured upon the table D centrally under the boring-stock, being either permanently fixed thereto or loosely set in a hole or socket therein, so as to project a short distance above the face of the table. The pattern K is provided in the under side with a configuration of holes, *k*, in which the guide-stud fits snugly.

The pattern, having had a chair seat or back secured to it upon its reverse side, is centered, by means of one of its holes, upon the fixed guide-stud of the table, and a corresponding hole bored through the seat or back, after which the connected pattern and seat or back are lifted and moved to the next hole, and so on successively until the entire design has been duplicated in the chair seat or back by the auger or drill.

A grooved pattern has been used, to which an article to be carved is secured, and a revolving carving-tool and a guide-stud have been combined therewith.

I claim as my invention—

The pattern having numerous holes in positions in line with the boring-tool and corresponding to the holes to be bored, and to which pattern the article to be bored is secured, in combination with a revolving boring-tool and a guide-stud corresponding in size to the holes in the pattern, substantially as specified.

Signed by me this 31st day of December, A. D. 1879.

GEO. GARDNER.

Witnesses:

GEO. T. PINCKNEY,

CHAS. H. SMITH.